Patented Oct. 3, 1933

1,929,113

UNITED STATES PATENT OFFICE 1,929,113

PROCESS OF TREATING BENTONITE AND THE LIKE

John D. Haseman, Linton, Ind.

No Drawing. Application October 15, 1930
Serial No. 489,007

6 Claims. (Cl. 252—2)

The invention relates to a method of processing and activating bentonites and the like, and it has for its object to provide a novel method of the nature stated for carrying out the method whereby bentonites and the like may be processed to yield greater catalytic properties such as oil decolorization with a minimum expenditure of chemicals and energy.

Hitherto it has been found that such clays or clay like materials as bentonite, indianaite, halloysite, etc. can be processed or treated with sulphuric acid to yield activated products which will decolorize oils. These activated products vary greatly in their decolorizing power due to impurities in the original beds of the clay, to actual chemical and physical states of the original clay, and to variation in methods of processing. Hence it has been impossible to produce large quantities of processed bentonite with uniformly high decolorizing properties.

I have discovered a method for processing bentonite and the like whereby the bleaching or decolorizing power of the processed product can be materially increased and at the same time make a uniform high grade product at a minimum cost.

I have discovered that those bentonites which contain considerable free calcium and magnesium carbonate cannot be processed with sulphuric acid to yield high grade decolorizing bentonite. This is also true of the water washed product and the water washed product containing very dilute hydrochloric acid.

I have discovered that certain types of crude bentonite, which contain about ten percent of free calcium and magnesium carbonate and silica, can be mixed with an equal weight of water and then treated with three-eighths of its weight of commercial hydrochloric acid for ten to thirty minutes at room temperature and then washed almost sand and chloride salts free to yield by means of exchange of bases a high grade bentonite. This improved bentonite pulp can then be treated with 64% of its weight on a dry basis of commercial sulphuric acid mixed in 200% of water and kept near boiling temperature for three to six hours and then washed acid and salt free to yield the highest grade of processed bentonite yet made.

In as much as the above type of bentonite contains a large excess of free calcium and magnesium carbonate, fully one-half of it can be washed out by hydraulic classification so that not more than one-half as much commercial hydrochloric acid is required to prepare the bentonite for the sulphuric acid treatment above outlined.

Some of the same types of crude bentonites, alkali earth sub-bentonites, do not contain any free calcium and magnesium carbonate or at least enough to satisfy a complete exchange bases. Dolomite can be added to such bentonite before they are treated with commercial hydrochloric acid or the chlorides of calcium and magnesium, either or both, may be added in the above concentration to perfect the aforesaid exchange of bases without the hydrochloric acid treatment.

I have also discovered that other natural and synthetic clay like decolorizing materials having exchange of base properties can also be made in a like manner into more effective decolorizing materials.

The preferred method for processing an alkali-earth sub-bentonite containing free carbonates of magnesium and calcium like a deposit near Wartrace, Tennessee will consist of a storage bin which has an automatic feeder delivering crude damp bentonite directly from the mine or storage to a disintegrater such as a vortex mixer which reduces the bentonite to at least sand grain fineness and automatically delivers the clay and water into a clay washer which removes the larger particles of free calcium and magnesium carbonates and sand and delivers the washed material to huge concrete settling tanks that will hold about 1,000 tons of clay thereby making a mixture of a large sample of the clay from the mine. There are several of the huge concrete tanks so that one can be filling, one settling, one acid treating, one decanting, etc. The tank full of washed bentonite is allowed to settle one or two days and is decanted so that the remaining thick pulp will contain around 50% solids. The pulp is treated with enough commercial hydrochloric acid to dissolve the free calcium and magnesium carbonate which will require about 14% by weight of the clay on a dry basis. It is allowed to settle and is decanted and washed until at least 90% of the free chlorides are removed. The washed pulp containing two parts water and one clay is treated with enough commercial sulphuric acid to make a concentration of 25% which requires 64% of the dry weight of the clay. It is then heated with steam in lead coils to near the boiling point for three to six hours and then is washed almost acid and alum free so that there is not more than one gram acid in each one thousand grams of wash water. The material can be used in this pulp form but is preferably conveyed to drum driers and dried at a temperature of 250 degrees Fahrenheit. The material is conveyed to a pulverizer and reduced to 200 mesh and bagged.

The above process produces active solid silicic acids loosely combined and intimately associated with calcium, megnesium and aluminum hydroxide which are mixed with traces of sulphuric acid, aluminum sulphate and iron sulphate, all of which are useful in decolorizing heavy acid oils.

While I have given the preferred method to process a bentonite containing free dolomite to yield a high grade decolorizing material of uniform quality, it is understood that the precentages and nature of materials may be materially changed without departing from the intention of the invention as set out in the above specifications.

I claim:—

1. The method of treating bentonite comprising disintegrating damp bentonite, washing it, treating it with hydrochloric acid, washing it, treating it with sulphuric acid and washing it almost free of acid and alum and drying and pulverizing it on a large scale.

2. The herein described method for disintegrating bentonite, adding pulverized dolomite (calcium carbonate and magnesium carbonate) treating it with hydrochloric acid, washing it, treating it with sulphuric acid and washing it almost free of acid and soluble salts and driving and pulverizing it.

3. The herein described method of disintegrating bentonite, washing it, adding calcium chloride and magnesium chloride, treating it with sulphuric acid and washing it almost free of acid and soluble salts, drying and pulverizing it.

4. The herein described process of washing bentonite, adding magnesium chloride, treating it with sulphuric acid, washing it almost free of acid and soluble salts, drying and pulverizing it.

5. The herein described method of washing bentonite, adding calcium chloride, treating it with sulphuric acid, washing it almost free of acid and soluble salts, drying and pulverizing it.

6. The herein described process for washing bentonites which have an excess of free dolomite (or calcium carbonate and magnesium carbonate), treating it with hydrochloric acid, washing it and treating it with sulphuric acid, washing it and drying and pulverizing it.

JOHN D. HASEMAN.